United States Patent
Shiue

(10) Patent No.: US 6,525,785 B2
(45) Date of Patent: Feb. 25, 2003

(54) PROJECTION APPARATUS USING L-SHAPED DICHROIC PRISM SET HAVING A CUBICALLY GLASS BLOCK JUXTAPOSED TO A DICHROIC PRISM FOR PASSING LIGHT BEAMS WITHOUT CHANGING DIRECTION OF THE LIGHT BEAMS

(75) Inventor: Shin-Gwo Shiue, Hsinchu (TW)

(73) Assignee: K Laser Technology, Inc., Hsinchu (TW)

( * ) Notice: Subject to any disclaimer, the term of this patent is extended or adjusted under 35 U.S.C. 154(b) by 0 days.

(21) Appl. No.: 09/765,571

(22) Filed: Jan. 22, 2001

(65) Prior Publication Data
US 2002/0097347 A1 Jul. 25, 2002

(51) Int. Cl.[7] ............................................. G02F 1/1335
(52) U.S. Cl. ................... 349/9; 349/5; 353/31; 353/122
(58) Field of Search ................. 349/5, 9; 353/31, 353/122

(56) References Cited

U.S. PATENT DOCUMENTS 5,467,206 A * 11/1995 Loiseaux et al. ............ 349/5
5,653,522 A * 8/1997 Loucks ...................... 353/122
5,738,426 A * 4/1998 Daijogo et al. ............. 353/31
6,186,629 B1 * 2/2001 Iwamura et al. ............ 353/31
6,247,814 B1 * 6/2001 Lin ............................ 353/20

FOREIGN PATENT DOCUMENTS

JP          407325283 A    * 12/1995

* cited by examiner

Primary Examiner—Huyen Ngo
(74) Attorney, Agent, or Firm—Rosenberg, Klein & Lee

(57) ABSTRACT

The present invention proposes a transmission-type liquid crystal projection display, which comprises an incident light source, a light-separating means, three transmission-type liquid crystal display, an L-shaped dichroic polarizing prism set, an optical path adjusting means, and a projection lens. The light source provides a single polarized light. The light-separating means separates the polarized light into three colored lights of the three primary wavelengths. The three liquid crystal displays respective correspond to the three colored lights. The optical path adjusting means is used to let the three colored lights travel through the corresponding three liquid crystal displays and then be incident on the L-shaped dichroic polarizing prism set so that the three colored lights can be synthesized into a single output light beam. The projection lens projects the output light beam onto a screen. The present invention has the effects of high efficiency, low cost, and simplified fabrication process.

6 Claims, 4 Drawing Sheets

PROJECTION APPARATUS USING
L-SHAPED DICHROIC PRISM SET HAVING
A CUBICALLY GLASS BLOCK
JUXTAPOSED TO A DICHROIC PRISM FOR
PASSING LIGHT BEAMS WITHOUT
CHANGING DIRECTION OF THE LIGHT
BEAMS

FIELD OF THE INVENTION

The present invention relates to liquid crystal projection system and, more particularly, to a transmission-type liquid crystal projection display using an L-shaped dichroic prism set.

BACKGROUND OF THE INVENTION

Transmission-type liquid crystal projection systems have advantages of high image quality, small volume, and portability, and can be used for fabricating large-area displays. However, because of different designs of their optical systems, the difficulties in fabrication differ. The operational principle of a liquid crystal display is to modulate the polarization state of light to change the intensity of output light so that gray scales of different brightness can be exhibited. Therefore, polarizing plates are arranged in front of and behind the liquid crystal display to adjust the intensity of light.

Prior art transmission-type liquid crystal projection displays can be divided into single-plate type and triple-plate type according to the count of adopted liquid crystal displays. The three-plate type liquid crystal projection display is more complex, but has better capability in brightness and resolution than the single-plate one. Therefore, high-quality liquid crystal projection displays are mainly the triple-plate type ones until now. A general triple-plate type liquid crystal projection display uses a cross dichroic prism set to synthesize polarized color lights of the three primary wavelengths into one (e.g., the projection displays disclosed in US. Pat. Nos. 5,073,013 and 5,075,798). The cost is higher, and the adopted cross dichroic prism set has problems of higher complexity and higher difficulty in structure and fabrication.

The present invention aims to propose a transmission-type liquid crystal projection display to resolve the above problems in the prior art.

SUMMARY OF THE INVENTION

The primary object of the present invention is to provide a transmission-type liquid crystal projection display having an L-shaped dichroic polarizing prism set so as to achieve the effects of high efficiency and low cost.

Another object of the present invention is to simplify the difficulty of a dichroic polarizing prism set used in a transmission-type liquid crystal projection display and the difficulty of fabricating the dichroic polarizing prism set.

According to the present invention, a transmission-type liquid crystal projection display comprises an incident light source. Two dichroic polarizing plates and three reflecting mirrors are used to separate the incident polarized light into three color lights of the three primary wavelengths. Each of the three color lights respectively pass a liquid crystal display and then is projected onto an L-shaped dichroic polarizing prism set, which comprises two dichroic polarizing prisms and an equivalent optical path glass block. Thereby, the color lights of the three primary wavelengths can be synthesized into a single light beam, which then passes a projection lens to be projected onto a screen.

The various objects and advantages of the present invention will be more readily understood from the following detailed description when read in conjunction with the appended drawings, in which:

DETAILED DESCRIPTION OF THE PREFERRED EMBODIMENTS

The present invention is characterized in that an L-shaped dichroic polarizing prism set is exploited to replace the prior art cross dichroic prism set so as to effectively resolve the problems in the prior art.

Figure 1:
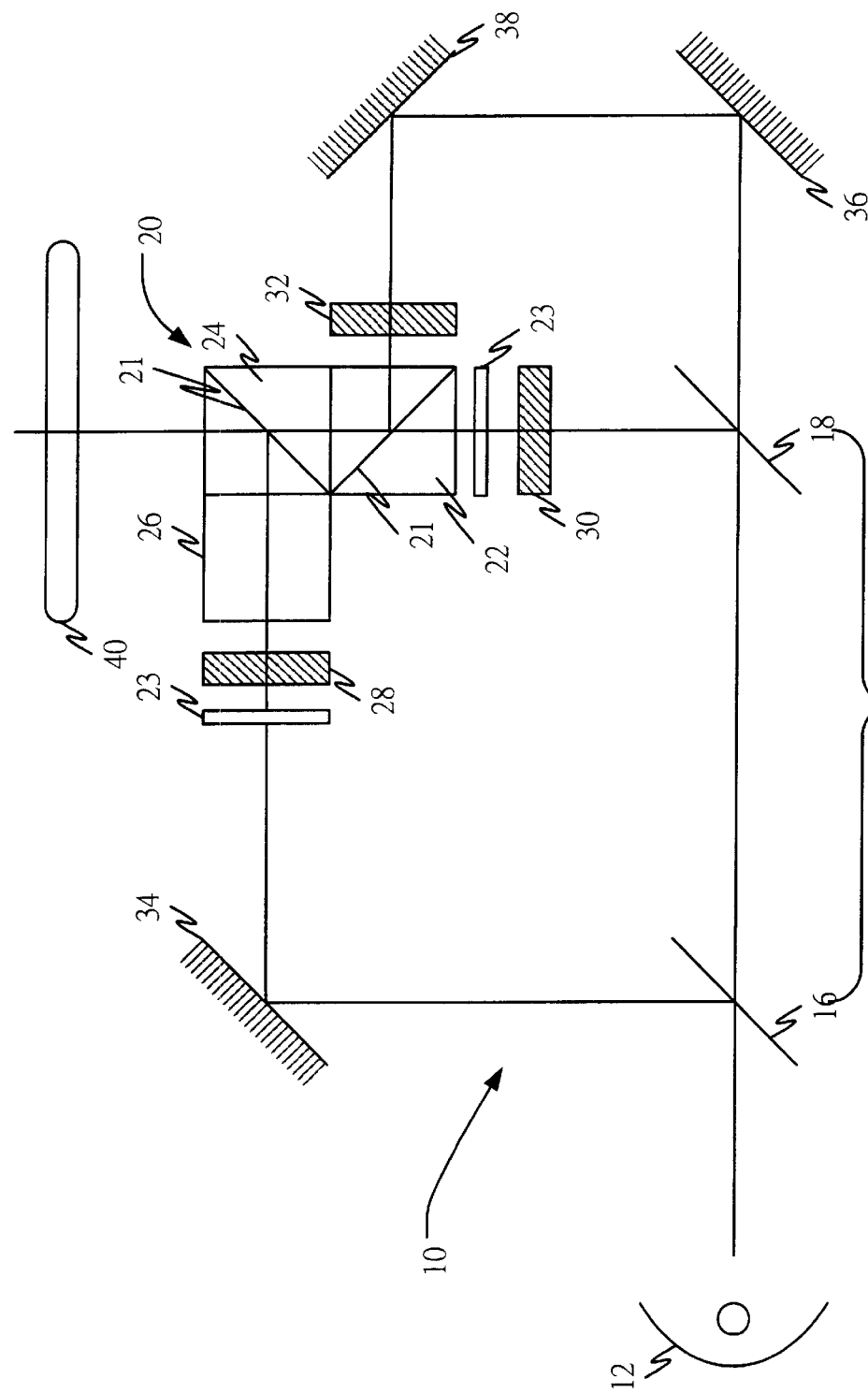
FIG. 1 is a structure diagram of the present invention.

As shown in FIG. 1, a transmission-type liquid crystal projection display 10 comprises an incident light source 12, a light-separating means 14, an L-shaped dichroic polarizing prism set 20, and an optical path adjusting means. The light source is used for providing a single-polarized parallel light beam, which can be a single S-polarized light or a single P-polarized light. The light-separating means 14 comprises a first dichroic polarizing plate 16 and a second dichroic polarizing plate 18. The first dichroic polarizing plate 16 is used to separate the three polarized lights of the three primary wavelengths (red, green, and blue) into two light beams and to let the light beam of the first color be reflected and the light beam of the other two colors be transmitted. The second dichroic polarizing plate 18 is used to further separate the light beam of the other two colors into two light beams and to let the light beam of the second color be reflected and the light beam of the third color be transmitted. The L-shaped dichroic polarizing prism set 20 comprises two adjacent dichroic polarizing prisms 22 and 24 and a equivalent optical path glass block 26. The L-shaped dichroic polarizing prism set 20 is used to synthesize the three colored lights into an output light beam. Transmission-type liquid crystal displays 28, 30, and 32 are arranged at the incident planes of the dichroic polarizing prism 22 and the incident plane of the equivalent optical path glass block 26 to correspond to the three colored lights, respectively. The optical path adjusting means is used to guide the three colored lights to pass from the light-separating means 14 through the corresponding liquid crystal displays 28, 30, and 32 and are incident on the L-shaped dichroic polarizing prism set 20. Thereby, the first colored light, the second colored light, and the third colored light can be synthesized into a single light beam.

In other words, the first colored light reflected by the first dichroic polarizing plate 16 is reflected using a first reflecting mirror 34 to control its traveling path, passes the liquid crystal display 28, is incident on and then transmitted through the equivalent optical path glass block 26, and then is incident on the dichroic polarizing prism 24 and is reflected therefrom. The second colored light reflected by the second dichroic polarizing plate 18 passes the liquid crystal display 30 and the dichroic polarizing prisms 22 and 24, and then is projected out. The third colored light is first reflected using two reflecting mirrors 36 and 38, passes the liquid crystal display 32, and is then reflected by the dichroic polarizing prism 22 to be transmitted through the dichroic polarizing prism 24. Thereby, the first colored light, the second colored light, and the third colored light can be synthesized into an output light beam, which is then projected onto a screen by a projection lens 40 to form pictures.

In the two dichroic polarizing prism sets described above, each dichroic polarizing prism is formed by gluing a first prism, a second prism, and a dielectric thin film 21 sandwiched in between. The characteristic of the dielectric thin film is to let colored lights be reflected or be transmitted. Further, wave plates 23 may be positioned in front or rear of liquid crystal display 28, 30, 32 to change polarizing states of colored lights incident to the displays 28, 30, 32 or exiting the same.

Figure 2:
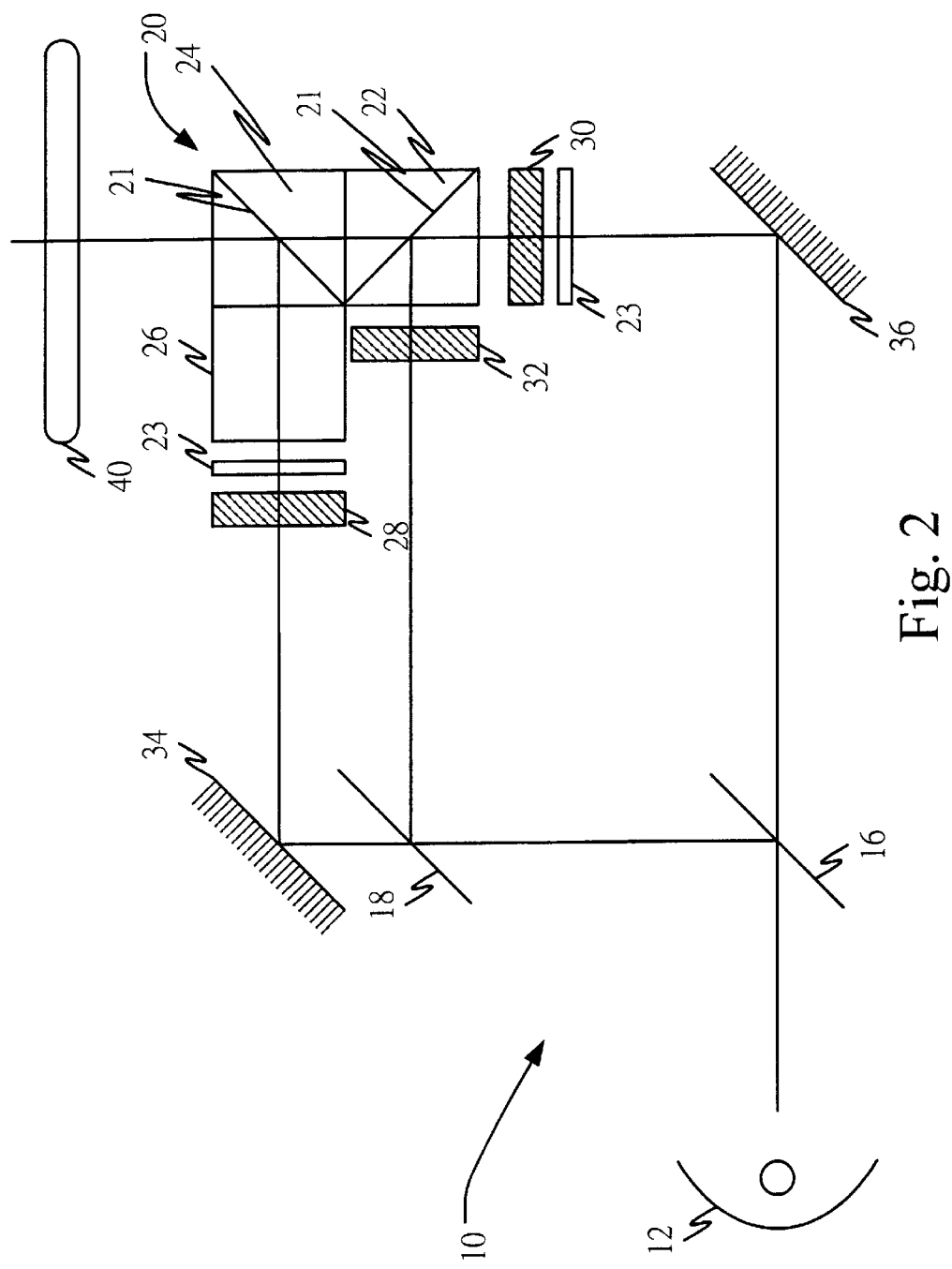
FIG. 2 is a diagram according to another embodiment of the present invention.

FIG. 2 shows another embodiment of the present invention, wherein the liquid crystal display 32 is arranged at another incident plane of the dichroic polarizing prism 22, and the second dichroic polarizing plate 18 is arranged between the first dichroic polarizing plate 16 and the reflecting mirror 34 to correspond to the liquid crystal display 32. The two reflecting mirrors 34 and 36 are exploited to adjust the optical paths of colored lights. The optical paths of colored lights of this embodiment is different from those shown in FIG. 1. Therefore, the first colored light transmitted through the first dichroic polarizing plate 16 is first reflected using a reflecting mirror 36, passes the liquid crystal display 30, is incident on the dichroic polarizing prism 22, is then transmitted through the dichroic polarizing prisms 22 and 24, and finally is projected out. The second colored light reflected by the second dichroic polarizing plate 18 first passes the liquid crystal display 32, is reflected by the dichroic polarizing prism 22, then passes the dichroic polarizing prism 24, and finally is projected out. The third light is first reflected using the reflecting mirror 34, passes the liquid crystal display 28 and the equivalent optical path glass block 26, and is reflected out by the dichroic polarizing prism 24. Thereby, the first, the second, and the third colored lights can be synthesized into an output light beam.

Figure 3:
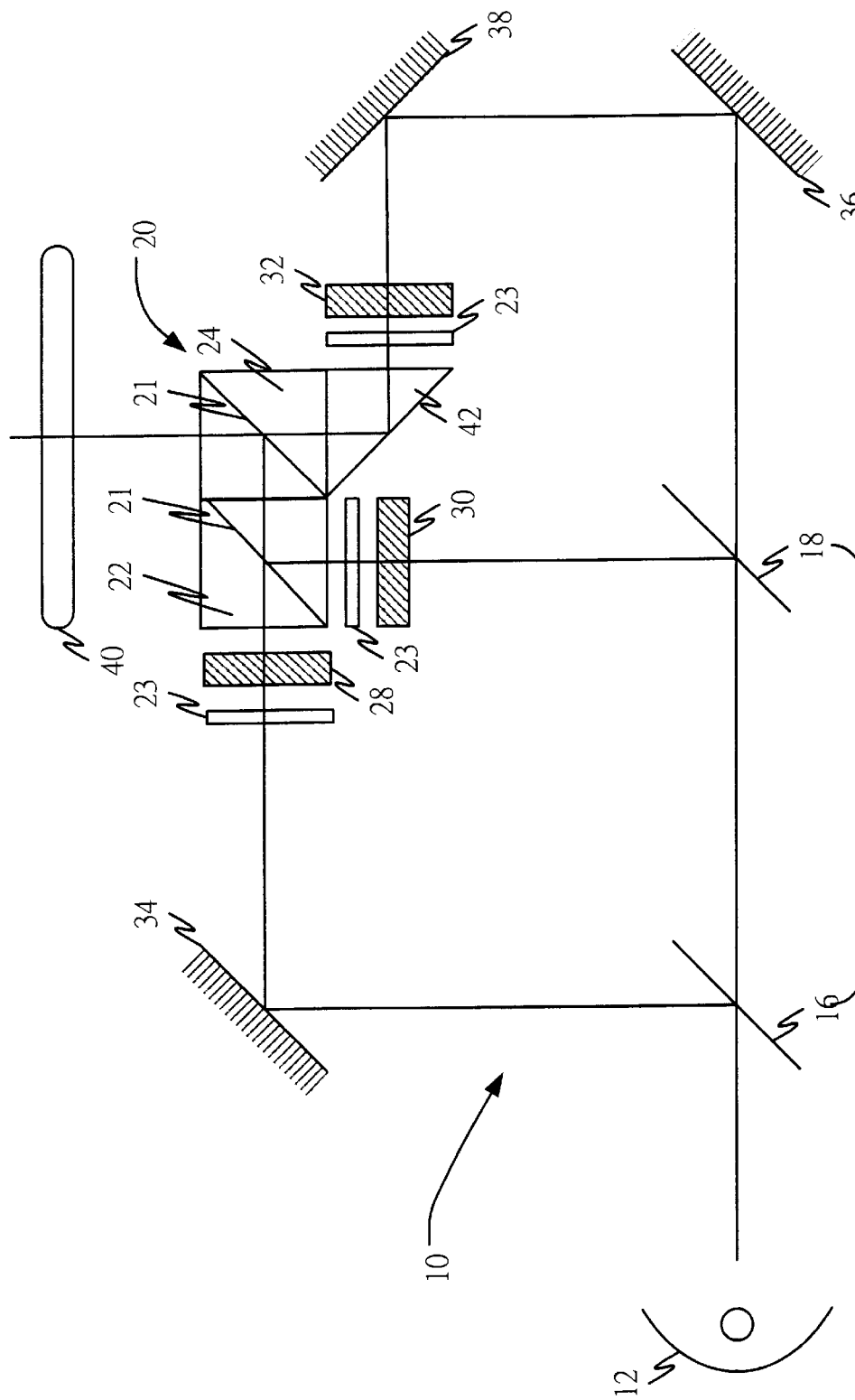
FIG. 3 is a diagram according to yet another embodiment of the present invention.

The L-shaped dichroic polarizing prism set 20 of the present invention can also be modified. As shown in FIG. 3, two dichroic polarizing prisms 22 and 24 are laterally adjacent, and an angular glass block 42 joins at one side of the dichroic polarizing prism 24. Liquid crystal displays 28, 30, and 32 are arranged at the two incident planes of the dichroic polarizing prism 22 and the incident plane of the angular glass block 42, respectively. The first colored light reflected by the first dichroic polarizing plate 16 is first reflected using a reflecting mirror 34, passes the liquid crystal display 28 and the dichroic polarizing prism 22, and is then reflected out by the dichroic polarizing prism 24. The second colored light reflected by the second dichroic polarizing plate 18 first passes the liquid crystal display 30, is reflected by the dichroic polarizing prism 22 and then by the dichroic polarizing prism 24 to be projected out. The third light is first reflected using the reflecting mirrors 36 and 38, passes the liquid crystal display 32, is reflected by the angular glass block 42, and then passes the dichroic polarizing prism 24. Thereby, the first, the second, and the third colored lights can be synthesized into an output light beam.

Figure 4:
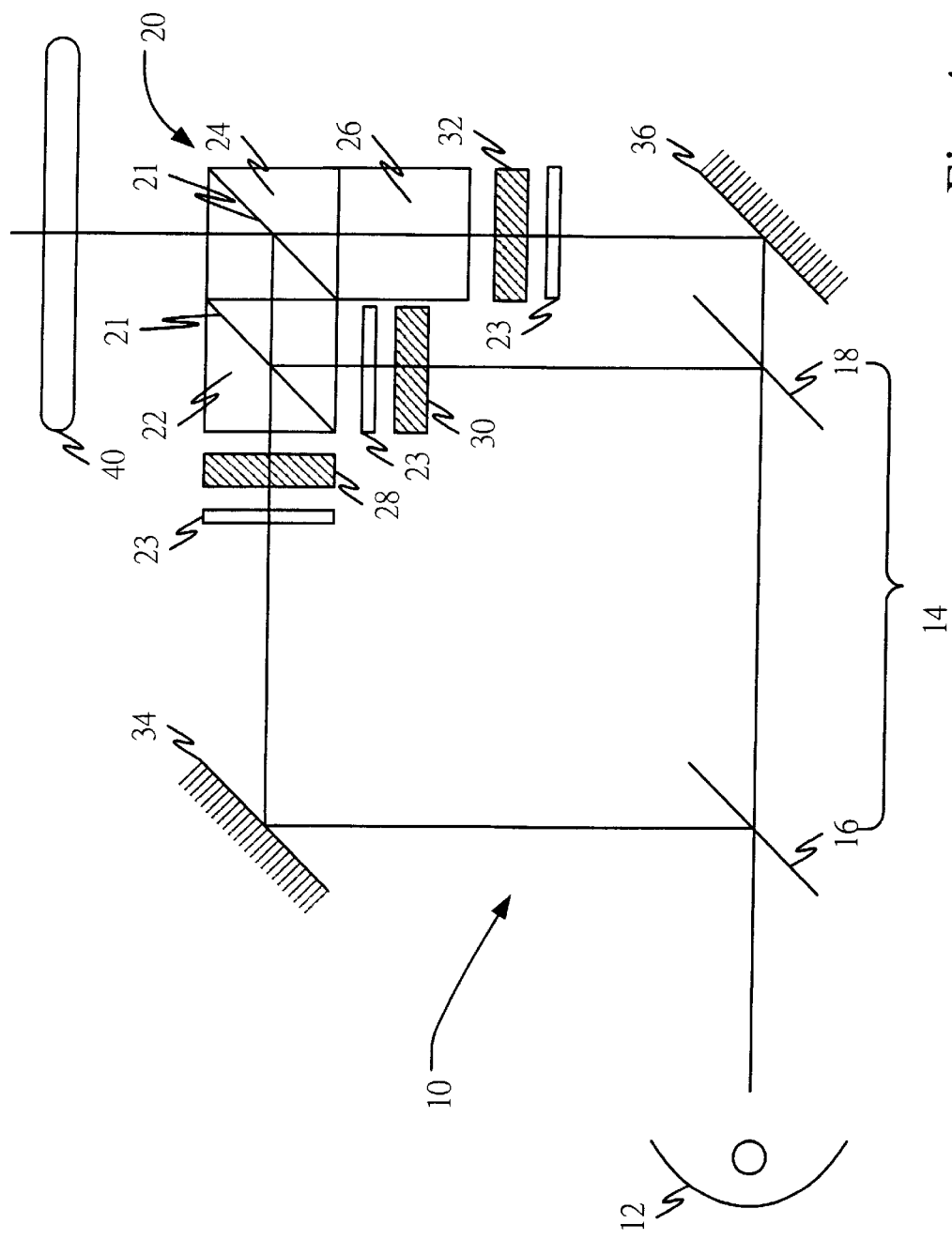
FIG. 4 is a diagram according to still yet another embodiment of the present invention.

Furthermore, the angular glass block 42 of the L-shaped dichroic polarizing prism set 20 can be replaced with an equivalent optical path glass block 26 in the present invention, as shown in FIG. 4. Except that the liquid crystal display 32 is arranged at the incident plane of the equivalent optical path glass block 26 and only a reflecting mirror 36 is used to adjust the optical path of the third colored light, other optical paths are the same as those of FIG. 3 and thus will not be further described.

To sum up, the characteristics of the L-shaped dichroic polarizing prism set is exploited in the present invention to simplify the difficulty of a dichroic polarizing prism set used in a transmission-type liquid crystal projection display and the difficulty of fabricating the dichroic polarizing prism set, thereby achieving the effects of high efficiency and low cost.

Although the present invention has been described with reference to the preferred embodiments thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A transmission-type liquid crystal projection display, comprising
    an incident light source for providing a single polarized light;
    a light-separating unit separating said polarized light into three colored light beams, each one of three primary wavelengths;
    three transmission-type liquid crystal displays respectively corresponding to said three colored light beams;
    an L-shaped dichroic polarizing prism set for synthesizing said three colored light beams into a single output light beam, said L-shaped dichroic polarizing prism set including two adjacent dichroic polarizing prisms and a cubically shaped equivalent optical path glass block, a light beam incident onto said cubically shaped equivalent optical path glass block passing therethrough free of change of direction and undergoing a reflection in a respective one of said dichroic polarizing prisms being in juxtaposition to said cubically shaped equivalent optical path glass block;
    optical path adjusting means for guiding said three colored light beams to travel from said light-separating unit through said corresponding liquid crystal displays to said L-shaped dichroic polarizing prism set; and
    a projection lens for projecting out said output light beam.

2. The transmission-type liquid crystal projection display as claimed in claim 1, wherein said single polarized light includes a P-polarized light or an S-polarized light.

3. The transmission-type liquid crystal projection display as claimed in claim 1, wherein said light-separating unit further comprises:
    a first dichroic polarizing plate reflecting a first colored light beam of said three colored light beams of said polarized light and allowing second and third colored light beams to be transmitted; and
    a second dichroic polarizing plate reflecting the second colored light beam and allowing the third colored light beam to be transmitted therethrough.

4. The transmission-type liquid crystal projection display as claimed in claim 1, further including at least one wave plate positioned in proximity to a respective one of said liquid crystal displays for changing the polarizing states of colored light beams incident onto said L-shaped dichroic polarizing prism set.

5. The transmission-type liquid crystal projection display as claimed in claim 1, wherein said optical path adjusting means includes a plurality of reflecting mirrors for adjusting the optical paths of said three colored light beams.

6. The transmission-type liquid crystal projection display as claimed in claim 1, wherein each of said two dichroic polarizing prisms comprises a first prism, a second prism, and a dielectric thin film sandwiched between said first prism and said second prism.

* * * * *

UNITED STATES PATENT AND TRADEMARK OFFICE
CERTIFICATE OF CORRECTION

PATENT NO. : 6,525,785 B2
DATED : February 25, 2003
INVENTOR(S) : Shin-Gwo Shiue It is certified that error appears in the above-identified patent and that said Letters Patent is hereby corrected as shown below:

<u>Title page,</u>
Item [73], insert second Assignee to read as:
-- Shin-Gwo Shiue, Hsinchu (TW) --

Signed and Sealed this

Second Day of September, 2003

JAMES E. ROGAN
*Director of the United States Patent and Trademark Office*